(12) United States Patent
Yukawa et al.

(10) Patent No.: US 11,338,822 B2
(45) Date of Patent: May 24, 2022

(54) VEHICLE AND STOP SWITCH APPARATUS

(71) Applicant: Panasonic Intellectual Property Management Co., Ltd., Osaka (JP)

(72) Inventors: Junichi Yukawa, Kanagawa (JP); Kenji Sugihara, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 261 days.

(21) Appl. No.: 16/596,307

(22) Filed: Oct. 8, 2019

(65) Prior Publication Data

US 2020/0108842 A1  Apr. 9, 2020

(30) Foreign Application Priority Data

Oct. 9, 2018  (JP) .............................. JP2018-190873

(51) Int. Cl.
| | |
|---|---|
| *B60W 50/14* | (2020.01) |
| *G05D 1/00* | (2006.01) |
| *B60W 50/00* | (2006.01) |
| *B60K 35/00* | (2006.01) |
| *B60K 6/28* | (2007.10) |
| *B60K 37/06* | (2006.01) |

(52) U.S. Cl.
CPC ............ *B60W 50/14* (2013.01); *G05D 1/0061* (2013.01); *G05D 1/0088* (2013.01); *B60K 6/28* (2013.01); *B60K 35/00* (2013.01); *B60K 37/06* (2013.01); *B60W 2050/0073* (2013.01); *B60Y 2200/91* (2013.01); *B60Y 2200/92* (2013.01); *B60Y 2400/432* (2013.01)

(58) Field of Classification Search
CPC .......... B60W 50/14; B60W 2050/0073; G05D 1/0088; G05D 1/0061; B60Y 2400/432; B60Y 2200/91; B60Y 2200/92; B60K 35/00; B60K 6/28; B60K 37/06; B60K 2370/175; B60K 2370/128
See application file for complete search history.

(56) References Cited

U.S. PATENT DOCUMENTS

| | | | | |
|---|---|---|---|---|
| 3,793,529 | A * | 2/1974 | Bucher ............... | F02N 11/0807 290/33 |
| 3,862,429 | A * | 1/1975 | Bucher .................. | F02N 11/10 290/37 R |
| 4,840,165 | A * | 6/1989 | Hua ...................... | F02P 15/003 123/606 |
| 5,115,108 | A * | 5/1992 | Ogawa ................. | H01H 13/705 200/1 B |
| 9,822,892 | B2 * | 11/2017 | Miura .............. | B60K 15/03519 |

(Continued)

FOREIGN PATENT DOCUMENTS

| | | |
|---|---|---|
| JP | 2018-82439 A | 5/2018 |
| WO | 2016/080452 A1 | 5/2016 |

*Primary Examiner* — Yonel Beaulieu
(74) *Attorney, Agent, or Firm* — Seed IP Law Group LLP

(57) ABSTRACT

A vehicle and a stop switch apparatus capable of accommodating various unexpected situations in a software operable vehicle. The vehicle is provided with a first operation section that allows operation of the vehicle without software, a second operation section capable of operating the vehicle by using software, a communicator that communicates with an external apparatus, and a stop switch that is provided physically and operable to stop operation of the second operation section without software.

14 Claims, 4 Drawing Sheets

(56) References Cited

U.S. PATENT DOCUMENTS

| | | | | |
|---|---|---|---|---|
| 2005/0225175 | A1* | 10/2005 | Maehara | B60W 10/06 307/10.1 |
| 2006/0261675 | A1* | 11/2006 | Unno | B60R 25/02156 307/10.2 |
| 2016/0124579 | A1* | 5/2016 | Tokutake | G06F 3/0486 345/156 |
| 2017/0186251 | A1* | 6/2017 | Lee | G07C 9/27 |
| 2018/0238291 | A1* | 8/2018 | Kiehn | B60K 6/485 |
| 2018/0328269 | A1* | 11/2018 | Aoyagi | F02D 41/0007 |
| 2019/0111912 | A1* | 4/2019 | Rockwell | B60L 58/12 |
| 2020/0055203 | A1* | 2/2020 | Binder | H04L 5/14 |
| 2020/0108842 | A1* | 4/2020 | Yukawa | B60W 50/14 |
| 2021/0072743 | A1* | 3/2021 | Otaki | B60W 60/001 |

\* cited by examiner

VEHICLE AND STOP SWITCH APPARATUS

TECHNICAL FIELD

This disclosure relates to a vehicle and a stop switch apparatus.

BACKGROUND ART

Currently, a vehicle capable of communicating with an external apparatus via a public Internet connection (so-called connected car) has been popularized (see, for example, Patent Literature 1).

Further, it is known that the Electronic Control Unit (ECU) is responsible for a large part of the vehicle operation by using software in recent vehicles, in particular, in the connected car and its evolved version, an automatic operation vehicle.

Therefore, in the above-mentioned vehicles, the importance of security measures against cyberattacks (viral infection of software) is increasing.

CITATION LIST

Patent Literature

PTL 1
Japanese Patent Application Laid-Open No. 2018-82439

SUMMARY OF INVENTION

Technical Problem

An object of one aspect of this disclosure is to provide a vehicle and a stop switch apparatus that can accommodate a variety of unexpected situations in a software operable vehicle.

Solution to Problem

A vehicle according to one aspect of the present disclosure includes: a first operation section that allows operation of the vehicle without software; a second operation section capable of operating the vehicle by using software; a communicator that communicates with an apparatus outside of the vehicle; and a stop switch that is provided physically and operable to stop operation of the second operation section without software.

A stop switch apparatus according to one aspect of the present disclosure is an apparatus to be mounted on a vehicle, the vehicle including a first operation section that allows operation of a vehicle without software, a second operation section capable of operating the vehicle by using software, and a communicator that communicates with an apparatus outside of the vehicle, the stop switch apparatus including: a stop switch provided physically; and a hardware logic circuit that stops operation of the second operation section without software when the stop switch is operated.

Advantageous Effects of Invention

According to an advantageous effect of an embodiment of this disclosure, it is possible to accommodate an unexpected situation even in a software operable vehicle.

DESCRIPTION OF EMBODIMENTS

Figure 1:
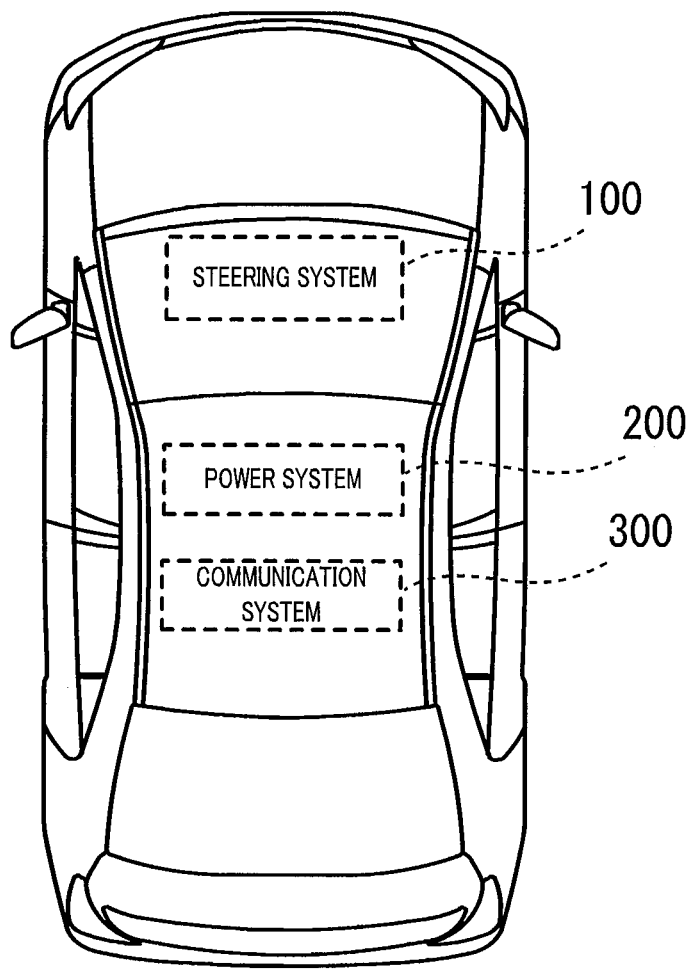
FIG. 1 is a top view schematically illustrating an example of a configuration of a vehicle according to an embodiment of this disclosure.

Hereinafter, embodiments of this disclosure will be described with reference to the accompanying drawings. It is noted that the same reference numerals are used for the same components in the figures.

<Vehicle V>

With reference to FIG. 1, the configuration of vehicle V according to the embodiment of this disclosure will be described. FIG. 1 is a top view schematically illustrating an example of a configuration of the vehicle according to an embodiment of this disclosure.

As illustrated in FIG. 1, vehicle V includes, for example, steering system 100, power system 200, and communication system 300.

Steering system 100 will be described later with reference to FIG. 2, and power system 200 will be described later with reference to FIG. 3.

Communication system 300 (an example of a communicator) is a system that communicates with an external apparatus via, for example, an Internet connection. Thus, vehicle V is a Connected Car.

Although not illustrated in the drawing, vehicle V includes, for example, an internal combustion engine (for example, a gasoline engine), a throttle body, a transmission, a brake system (for example, a brake booster), a lateral slip prevention apparatus (Electronic Stability Control: ESC), a headlight, and an air bag.

<Steering System 100>

The configuration of steering system 100 will be described with reference to FIG. 2. FIG. 2 is a diagram illustrating an example of a configuration of steering system 100 simulating a rack-and-pinion type electric power steering.

Figure 2:
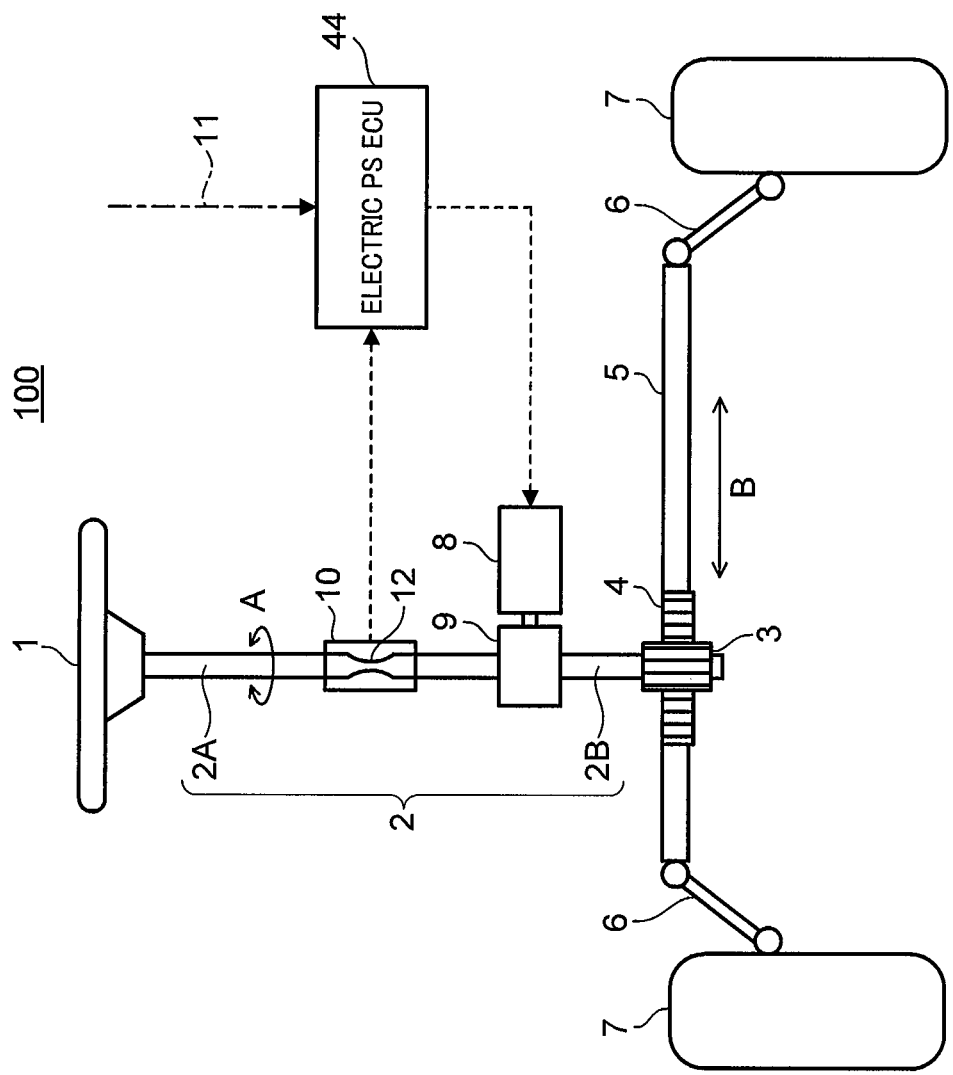
FIG. 2 is a diagram schematically illustrating an example of a configuration of a steering system to be mounted on the vehicle according to the embodiment of this disclosure.

As illustrated in FIG. 2, steering system 100 includes steering wheel 1, steering shaft 2 (2A, 2B), pinion gear 3, rack 4, tie rod 5, knuckle arm 6, wheels 7, assist motor 8, gear box 9, torque sensor 10, electric PS (Power Steering) ECU 44, and communication line 11.

One end of steering shaft 2 (2A) is fixed to steering wheel 1 which is steered (rotational operation) by a driver of vehicle V. Pinion gear 3 is provided at the other end of steering shaft 2 (2B). Further, steering shaft 2 is provided with gear box 9 and torque sensor 10, which will be described later.

Pinion gear 3 meshes with rack 4, and the left and right rotational movement of steering shaft 2 is converted into the reciprocating linear motion in the axial direction of tie rod 5 via pinion gear 3 and rack 4, and tie rod 5 connected to rack 4. In FIG. 2, arrow A indicates the rotational direction of steering shaft 2, and arrow B indicates the axial direction of rack 4.

Steering system 100 is an Ackermann type steering, and the movement of tie rod 5 in the direction of an arrow B steers the wheels 7 by means of the link mechanisms formed by right and left knuckle arms 6.

An output shaft of assist motor 8 is connected to steering shaft 2 via gear box 9 to assist steering of the driver.

Although the configuration illustrated in FIG. 2 uses a method of applying an assist force to steering shaft 2, a method of applying a motor assist force to pinion gear 3 and rack 4 may be adopted.

The driving of assist motor 8 is controlled by electric PS ECU 44.

Electric PS ECU 44 drives assist motor 8 on the basis of the steering direction and the steering torque detected by torque sensor 10 and the vehicle velocity information obtained from communication line 11.

Torque sensor 10 has a torsion bar 12 inside. The steering operation of the driver causes torsion bar 12 to be slightly twisted, so that the phases of steering shaft 2A and steering shaft 2B are changed. Thus, torque sensor 10 detects the state of steering.

Communication line 11 is a communication line for vehicle control, which is called, for example, a Controller Area Network (CAN). Communication line 11 transmits, for example, vehicle velocity information or the like. The vehicle velocity information is generated, for example, based on information obtained from a wheel velocity sensor of a brake control system, not illustrated.

An arrow of a broken-line illustrated in FIG. 2 indicates a flow of an electric signal, and an alternate long and short dash line indicates a flow of a communication signal.

Among the components illustrated in FIG. 2, steering wheel 1, steering shaft 2A, torsion bar 12, steering shaft 2B, pinion gear 3, rack 4, tie rod 5, knuckle arm 6, and wheels 7 correspond to an example of "a first operation section that allows operation of vehicle V without software" (hereinafter referred to simply as a "first operation section").

The first operation section is a steering system in a primitive vehicle which is not equipped with a power steering and is steered only by a mechanical mechanism. Therefore, in vehicle V of the present embodiment, even if electric PS ECU 44 does not function, the driver can steer vehicle V through the first operation section.

Among the components illustrated in FIG. 2, assist motor 8, torque sensor 10, communication line 11, and electric PS ECU 44 correspond to an example of a "second operation section capable of operating vehicle V by using software" (hereinafter referred to simply as "second operation section").

<Power System 200>

Figure 3:
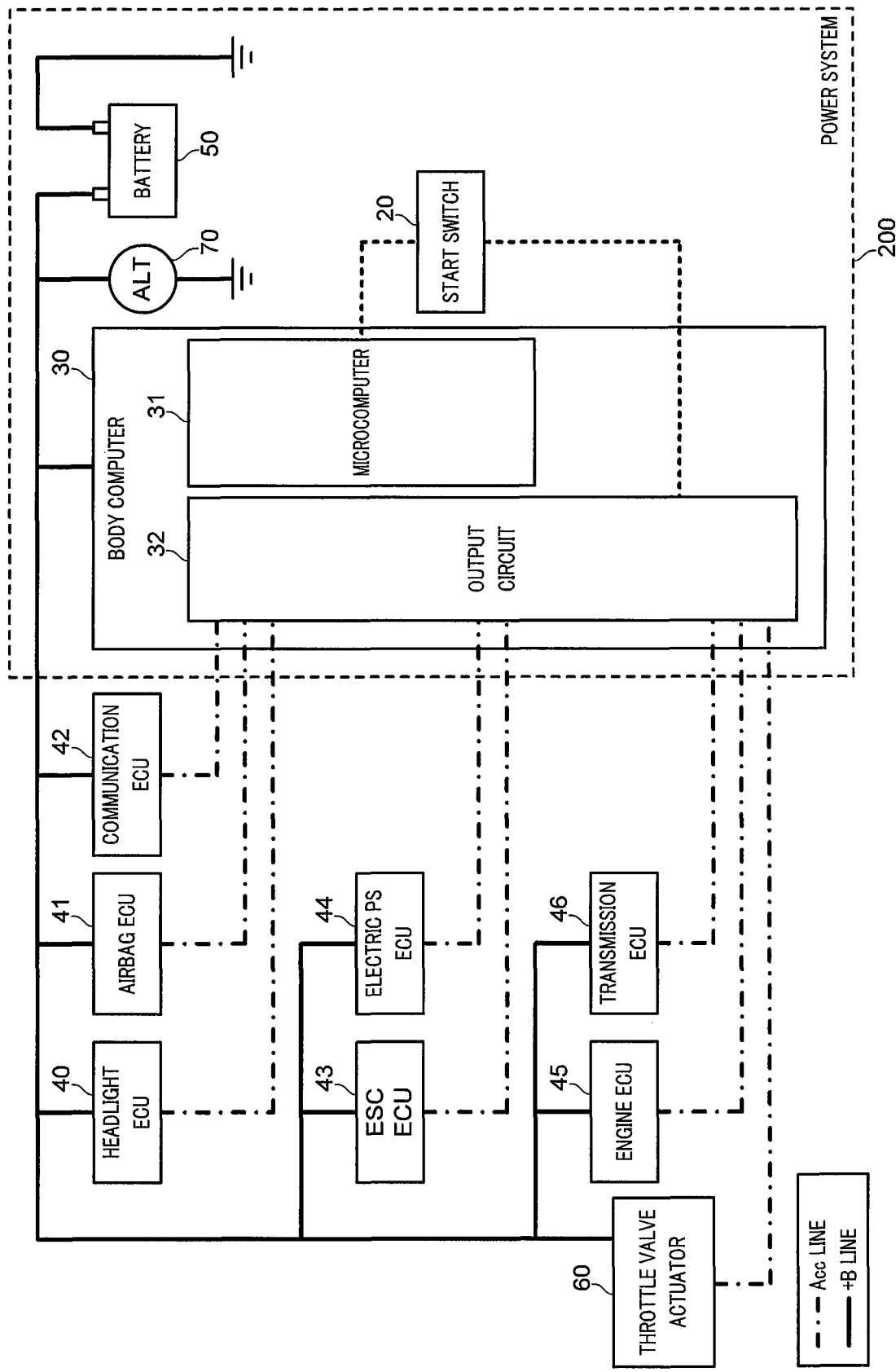
FIG. 3 is a diagram schematically illustrating an example of a power system to be mounted on the vehicle and a wiring configuration thereof according to the embodiment of this disclosure.

With reference to FIG. 3, a wiring configuration of power system 200 and a vehicle serving as a load will be described. FIG. 3 is a diagram schematically illustrating an example of power system 200 and a wiring configuration thereof.

As illustrated in FIG. 3, power system 200 includes start switch 20, body computer 30, battery 50, and generator 70.

Generator 70 is belt-driven by an engine, not illustrated to supply electric power necessary for vehicle V. In the case where vehicle V is a hybrid vehicle or an EV vehicle, a DC-DC converter which receives electric power from a high-voltage motor drive battery is provided in place of generator 70. The DC-DC converter realizes the same function as that of generator 70.

Battery 50 is used for supplying a standby power supply during stopping, and for driving a starter motor, not illustrated.

Body computer 30 is provided with microcomputer 31 and output circuit 32. Output circuit 32 is constituted of a switch circuit for connecting/disconnecting electric power by a logic circuit. The switching circuit is a relay, a semiconductor relay, or the like.

As illustrated in FIG. 3, the vehicle system connected to the power supplied by power system 200 includes headlight ECU 40, airbag ECU 41, communication ECU 42, ESC ECU 43, electric PS ECU 44, engine ECU 45, transmission ECU 46, and throttle valve actuator 60.

Start switch 20 corresponds to an example of a "stop switch". Start switch 20 and output circuit 32 correspond to an example of the components of the "stop switch apparatus".

First, the connection relationship of the components illustrated in FIG. 3 will be described.

Start switch 20 is electrically connected to each of microcomputer 31 and output circuit 32 of body computer 30.

As illustrated in FIG. 3, as a wiring configuration of the vehicle, there are a +B line which is constantly energized by battery 50, and an Acc line in which power supply is started/terminated via body computer 30 by the operation of start switch 20. Each of the devices is provided with a fuse, not illustrated. In this way, a countermeasure is taken to prevent the short circuit failure from immediately resulting in stop of other devices.

In the configuration of FIG. 3, basically the vehicle system side is connected to the power supply lines of the two systems including the +B line and the Acc line, but the present invention is not limited thereto.

In the case of a connected device with less power consumption, there is also a device in which only the Acc is connected. On the other hand, as for the device which requires large current of 100 A or more to drive assist motor 8 like electric PS ECU 44, it is not possible to obtain much electric power in the case of electric power supply from the Acc line due to the limitation of the relay or the like, so that electric power is supplied from the +B line.

However, in the +B line, power supply is also performed even while parked in the nighttime. This brings about excessive power consumption, causing a situation such as a battery exhaustion. Therefore, it is preferable that the control functions of the various ECUs is started by the power supply from the Acc line, and that the switching circuit which requires a large current such as the motor drive is supplied with the power supply from the +B line.

On the other hand, body computer 30 and the smart entry serving as the key function of vehicle V not illustrated are always connected to the +B line in constant energization since it is necessary to be ready even when the vehicle is stopped.

The connection relationship of the components illustrated in FIG. 3 has been described above.

Next, the functions of the components illustrated in FIG. 3 will be described.

Headlight ECU 40 (one example of a headlight control apparatus) controls the operation of a headlight, not illustrated.

Airbag ECU 41 (an example of an airbag control apparatus) controls the operation of an airbag, not illustrated.

Communication ECU 42 controls wireless communication with an external apparatus (for example, a server apparatus) via the Internet connection. Communication ECU 42 is included in the communication system 300 illustrated in FIG. 1, for example.

ESC ECU 43 controls the operation of a lateral slip prevention apparatus (ESC), not illustrated.

As described above, electric PS ECU 44 controls operation of assist motor 8 illustrated in FIG. 2.

Engine ECU 45 (an example of the internal combustion engine control apparatus) controls the operation of an internal combustion engine, not illustrated. For example, engine ECU 45 controls operation of throttle valve actuator 60 which will be described later.

Transmission ECU 46 controls operation of a transmission, not illustrated.

Throttle valve actuator 60 opens and closes a throttle valve provided in a throttle body, not illustrated, under the control of engine ECU 45. Thereby, the amount of air flowing into the cylinder of the gasoline engine is adjusted, and as a result, the output of the engine is varied.

Headlight ECU 40, airbag ECU 41, communication ECU 42, ESC ECU 43, electric PS ECU 44, engine ECU 45, transmission ECU 46, and throttle valve actuator 60 described above correspond to an example of the second operation section.

Start switch 20 is a switch to be pressed when the occupant starts the internal combustion engine. Start switch 20 is physically provided in the vicinity of the driver's seat (for example, an instrument panel), for example.

Furthermore, start switch 20 also functions as a stop switch that can stop the operation of the second operation section without software.

For example, start switch 20 is a two stage switch which allows an occupant to make depression in two stages. Start switch 20 functions as a start switch in a pressing operation in a first stage (an example of a first operation mode), and functions as a stop switch in a pressing operation in a second stage (an example of a second operation mode).

The pressing operation in the second stage is performed by the occupant when the occupant feels an abnormality (for example, an abnormality caused by a cyberattack) in the operation of vehicle V while vehicle V is traveling. That is, the pressing operation in the second stage is performed when an emergency occurs.

The pressing pressure required for the pressing operation at the second stage is larger than the pressing pressure required for the pressing operation in the first stage. Since the pressing operation in the first stage is operation with a high execution frequency, a pressing pressure is preferably a pressing pressure which can be easily operated by an occupant. On the other hand, since the pressing operation in the second stage is performed when an emergency occurs, a pressing pressure is preferably such that the occupant can be prevented from operating unintentionally. In addition to the pressing pressure, the stroke (press-in amount) required for the pressing operation in the second stage may be made larger than the stroke required for the pressing operation in the first stage.

The internal configuration of start switch 20 will be described later with reference to FIG. 4.

When the pressing operation in the first stage is performed in start switch 20 (for example, when the first energized state, which will be described later, is established), microcomputer 31 of body computer 30 instructs output circuit 32 to turn all of the Acc lines illustrated in FIG. 3 into the energized state.

Output circuit 32 of body computer 30 is a hardware logic circuit.

As described above, output circuit 32 sets all of the Acc lines illustrated in FIG. 3 to the energized state based on the instruction from microcomputer 31. Thus, headlight ECU 40, airbag ECU 41, communication ECU 42, ESC ECU 43, electric PS ECU 44, engine ECU 45, transmission ECU 46, and throttle valve actuator 60 are each operated (or may be actuated).

In the case where the pressing operation in the second stage is performed in start switch 20 (for example, the second energized state, which will be described later is established), output circuit 32 sets the Acc line connected to the predetermined second operation section to the non-energized state. Thus, the operation of the predetermined second operation section is stopped. This means that the operation of the software is stopped.

That is, output circuit 32 can switch the energization/non-energization of the Acc line based on the instruction of microcomputer 31, and when the pressing operation in the second stage of start switch 20 is performed, the Acc line can be brought into the non-energized state. When the pressing operation in the second stage of start switch 20 is performed, the logic circuit of the hardware is set so that the Acc line is set to the non-energized state regardless of the instruction of microcomputer 31.

The predetermined second operation section includes, for example, all of an assist motor 8, torque sensor 10, headlight ECU 40, airbag ECU 41, communication ECU 42, ESC ECU 43, electric PS ECU 44, engine ECU 45, transmission ECU 46, and throttle valve actuator 60.

The functions of the components illustrated in FIG. 3 have been described above.

<Start Switch 20>

Figure 4:
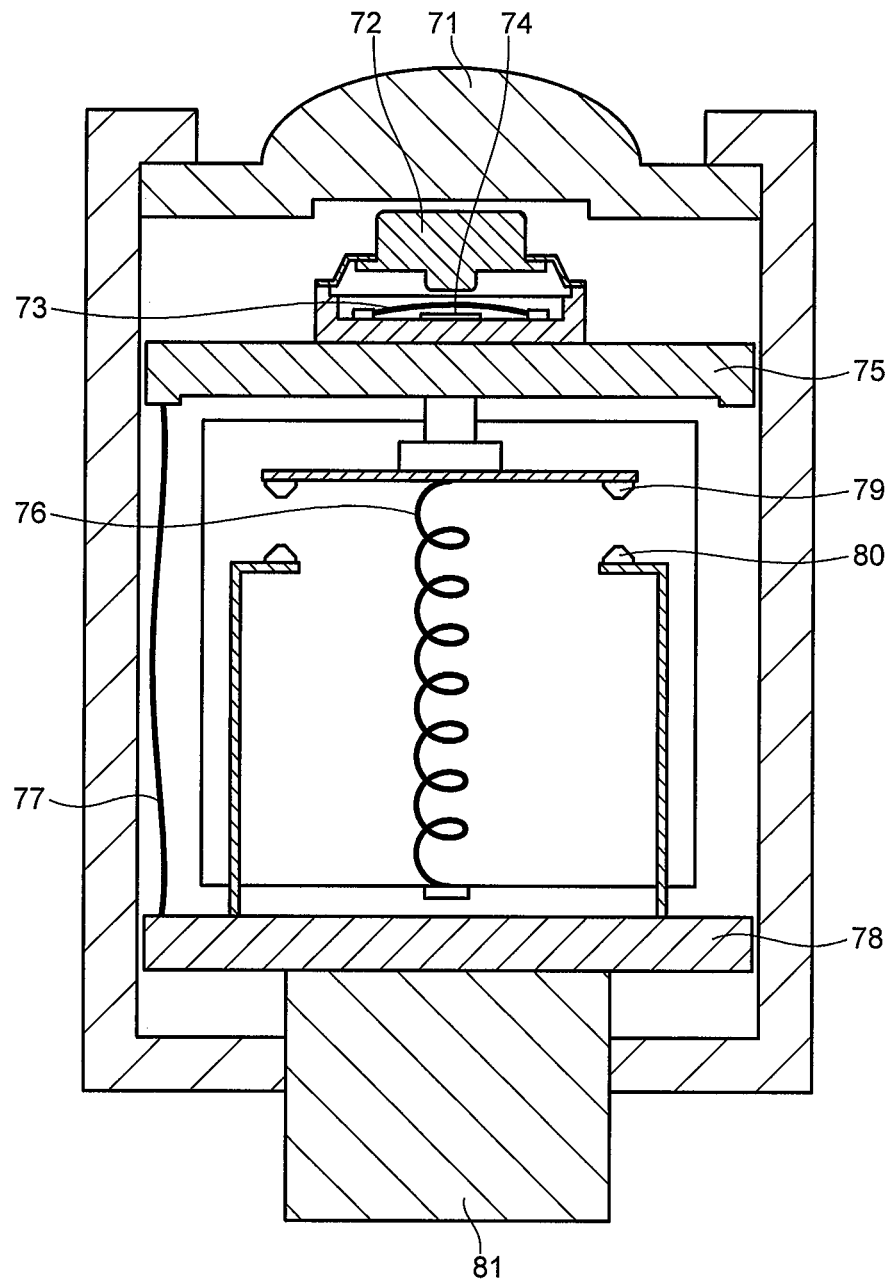
FIG. 4 is a diagram schematically illustrating an example of the internal configuration of a start switch to be mounted on a vehicle according to the embodiment of this disclosure.

With reference to FIG. 4, the internal structure of start switch 20 will be described. FIG. 4 is a cross-sectional view schematically illustrating an example of the internal configuration of start switch 20. FIG. 4 illustrates a state in which neither the pressing operation in the first stage nor the pressing operation in the second stage is performed.

As illustrated in FIG. 4, start switch 20 includes key top 71, protrusion 72, diaphragm 73, conductive circuit (contact portion) 74, first substrate 75, spring 76, electrical wiring 77, second substrate 78, first contact portion 79, second contact portion 80, and connector 81. Connector 81 is connected to each of microcomputer 31 and output circuit 32 illustrated in FIG. 3.

When the pressing operation in the first stage is performed, key top 71 is moved downward (lower side in FIG. 4) to depress protrusion 72, and protrusion 72 presses diaphragm 73 against conductive circuit 74. As a result, conduction is established between diaphragm 73, conductive circuit 74, first substrate 75, electrical wiring 77, second substrate 78, and connector 81, so that the first energized state is established. When the first energized state is established, as described above, output circuit 32 brings all of the Acc lines to be energized in accordance with the instruction from microcomputer 31.

The distance between protrusion 72 and conductive circuit 74 illustrated in FIG. 4 is the stroke (press-in amount) of the pressing operation in the first stage.

When the pressing operation in the second stage is performed, key top 71 is moved downward to depress protrusion 72, and protrusion 72 presses diaphragm 73 against conductive circuit 74. Further, when first substrate 75 is moved downward, spring 76 contracts, so that first contact portion 79 and second contact portion 80 are brought into contact with each other. As a result, diaphragm 73, conductive circuit 74, first substrate 75, electrical wiring 77, second substrate 78, first contact portion 79, second contact portion 80, and connector 81 are electrically connected to each other, so that the second energized state is established. When the second energized state is established, as described above, output circuit 32 brings the Acc line (for example, all Acc lines) connected to the predetermined second operation section into the non-energized state.

In the above description, start switch 20 is configured to be energized from the non-energized state to the energized state by a predetermined pressing operation. However, the present invention is not limited thereto. For example, start switch 20 may be configured to be changed from the energized state to the non-energized state when a predetermined pressing operation is performed.

Advantageous Effects of One Example

As described above, vehicle V of the present embodiment is a vehicle including a first operation section that can operate vehicle V without software and a second operation section that can operate vehicle V by using software and communicating with the external apparatus, wherein the vehicle includes a stop switch that is physically provided and can stop the operation of the second operation section without software.

Therefore, the occupant can stop the operation of the second operation section capable of operating vehicle V by using the software by operating the stop switch when the operation of vehicle V is felt abnormal during traveling. Vehicle V in which the operation of the second operation section is stopped is, for example, in a state of inertia traveling or slow traveling, and can be stopped by a brake.

Therefore, vehicle V of the present embodiment can be switched so that vehicle V can be operated without using software, which allows vehicle V to accommodate an unexpected situation.

MODIFIED EXAMPLE

This disclosure is not limited to the description of the embodiment described above, and various modifications can be made without departing from the spirit and scope of the present invention. Hereinafter, each modified example will be described.

Modified Example 1

In the above embodiment, all the operation of the second operation section is stopped, but the present invention is not limited thereto.

In the second operation section, a part of the second operation section that operates to affect the driving operation of the vehicle may be excluded from a part whose operation is to be stopped. The second operation section to be excluded in this manner is hereinafter referred to as an "excluded second operation section".

Note that the excluded second operation section may have a low influence on the safety surface even if a malfunction occurs.

A description will now be given of a case where headlight ECU 40, airbag ECU 41, and engine ECU 45 of the second operation section illustrated in FIGS. 2 and 3 are defined in the excluded second operation section.

In this case, when the pressing operation in the second stage is performed, output circuit 32 maintains only the Acc line connected to headlight ECU 40, airbag ECU 41, and engine ECU 45 in the energized state, and brings the other Acc line into the non-energized state.

Headlight ECU 40 continues a state in which headlight ECU 40 can accept the operation of the driver for the headlight. Therefore, for example, when operation for instructing lighting of the headlight is accepted, headlight ECU 40 turns on the headlight.

Engine ECU 45 continues the operation of controlling the fuel injection apparatus (not illustrated) to inject fuel into the internal combustion engine, for example. Thus, the rotation of the internal combustion engine is maintained. Thus, the brake booster, which generates a force by pressure difference of both sides of the diaphragm by means of the intake negative pressure of the engine, can function.

On the other hand, throttle valve actuator 60 is stopped, and engine ECU 45 does not receive the control. Since the throttle valve is closed by stopping the operation of throttle valve actuator 60, and the rotation is maintained as described above, the internal combustion engine is brought into an idle state.

As described above, in vehicle V, after the pressing operation in the second stage is performed, vehicle V is traveling by inertia or slowly traveling. At this time, the occupant can continue driving operation by using the first operation section (for example, the steering wheel 1 or the like). As described above, the brake booster also functions, so that the occupant can stop vehicle V at a desired location.

Furthermore, airbag ECU 41 continues to operate the airbag. Thus, for example, when vehicle V collides with an obstacle or the like, airbag ECU 41 operates the airbag. Therefore, the safety of the traveling after the pressing operation in the second stage can be secured.

The case where headlight ECU 40, airbag ECU 41, and engine ECU 45 are defined in the excluded second operation section has been described above.

At least one of headlight ECU 40, airbag ECU 41, and engine ECU 45 may be defined in the excluded second operation section.

Although not illustrated, at least one of a wiper ECU (an example of a wiper control apparatus) that controls the operation of the wiper, a hazard lamp ECU (an example of a hazard lamp control apparatus) that controls the operation of the hazard lamp, a power window ECU (an example of a power window control apparatus) that controls the opening and closing of the power window, and a door lock ECU (an example of a door lock control apparatus) that controls locking/unlocking of lock of the door may be determined in the excluded second operation section. At least one of them may be defined as being caused to stop operation.

Modified Example 2

In the embodiment, a case where start switch 20 also has the function of the stop switch has been exemplified. However, the invention is not limited thereto. For example, a physical switch has a function of a stop switch may be provided separately from start switch 20.

Modified Example 3

In the embodiment, the case where start switch 20 is a button for receiving the two stage pressing operation has been described as an example, but the present invention is not limited thereto.

For example, start switch 20 may be a lever allowing a pressing operation and a pulling operation, or a lever allowing leftward and rightward rotational operation.

The former lever may function as a start switch in, for example, a pressing operation (an example of a first operation mode), and may function as a stop switch in a pulling operation (an example of a second operation mode).

The latter lever may function as a start switch in, for example, a leftward rotational operation (an example of a first operation mode), and may function as a stop switch in a rightward rotational operation (an example of a second operation mode).

Modified Example 4

In the embodiment, in order to make an occupant know that start switch 20 functions as a stop switch, vehicle V may display how to function start switch 20 as the stop switch (for example, a method of a pressing operation in the second stage) in a display mounted on vehicle V by illustration, text data, or the like. The timing of the display may be, for example, when the ignition key is turned on. Moreover, in addition to the display, vehicle V may output the sound of the description of the method described above from a speaker or the like.

Modified Example 5

In the embodiment, the second operation section may be capable of operating vehicle V (for example, relating to automatic operation) on the basis of information detected by the in-vehicle sensor or information obtained by external communication, without depending on the operation performed by the driver.

Modified Example 6

In the embodiment, a case where the communication with the outside of the vehicle performed by vehicle V is communication via an Internet connection has been described. However, the invention is not limited thereto. Vehicle V may perform wireless communication via a line other than the Internet connection, or may perform wired communication. The wired communication includes, for example, the auto diagnosis function (on-board diagnostics: OBD) of an automobile.

Modified Example 7

Vehicle V may be a gasoline vehicle or a diesel vehicle.

Also, vehicle V may be a hybrid vehicle (HV), a plug in hybrid vehicle (PHV), a plug in hybrid electric vehicle (PHEV), an electric vehicle (EV), or the like.

For example, when vehicle V is EV, the negative pressure electric pump may be defined in the excluded second operation section.

Modified Example 8

In the embodiment, a case where a method of stopping the operation of the second operation section is to bring the Acc line into the non-energized state has been described. However, the invention is not limited thereto.

For example, vehicle V may be provided with a means capable of physically discarding a predetermined second operation section when the pressing operation in the second stage is performed in start switch 20.

Modified Example 9

In the embodiment, a case where output circuit 32 can switch the energization/non-energization of the Acc line based on the instruction of microcomputer 31, and when the pressing operation in the second stage of start switch 20 is performed, the Acc line can be brought into the non-energized state has been exemplified. However, the method of transferring the ACC line to the non-energized state is not limited thereto.

For example, when a switch is provided on the signal line between microcomputer 31 and output circuit 32, and when the pressing operation in the second stage of start switch 20 is performed, the switch may be turned off (the configuration in which the second stage of start switch 20 and the switch is interlocked), so that the Acc line may be brought into the non-energized state. In this case, when there is no instruction from microcomputer 31, output circuit 32 is configured to bring the Acc line to a non-energized state by logic circuit.

In addition, the Acc line may be brought into the non-energized state by providing a relay on the Acc line from output circuit 32 and configuring the relay to be turned off when the pressing operation in the second stage of start switch 20 is performed.

More specifically, for example, such a configuration is also applicable that an electric power line connecting a control power source and the relay coil are connected by the pressing operation in the second stage of start switch 20, and the relay is turned OFF so that the relay coil is energized and the ACC line is brought into the non-energized state when the pressing operation in the second stage of start switch 20 is performed.

The various modified examples described above may be appropriately combined with each other.

While various embodiments have been described herein above, it is to be appreciated that various changes in form and detail may be made without departing from the spirit and scope of the invention(s) presently or hereafter claimed.

This application is entitled and claims the benefit of Japanese Patent Application No. 2018-190873, filed on Oct. 9, 2018, the disclosure of which including the specification, drawings and abstract is incorporated herein by reference in its entirety.

INDUSTRIAL APPLICABILITY

The vehicle and the stop switch apparatus of this disclosure can be applied to vehicles that communicate with outside of the vehicle.

REFERENCE SIGNS LIST

1 steering wheel
2, 2A, 2B steering shaft
3 pinion gear
4 rack
5 tie rod
6 knuckle arm
7 wheel
8 assist motor
9 gear box
10 torque sensor
11 communication line
12 torsion bar
20 start switch
30 body computer
31 microcomputer
32 output circuit
40 headlight ECU
41 airbag ECU
42 communication ECU
43 ESC ECU
44 electric PS ECU
45 engine ECU
46 transmission ECU
50 battery
60 throttle valve actuator
70 generator
71 key top
72 protrusions
73 diaphragm
74 conductive circuit
75 first substrate 76 spring
77 electrical wiring
78 second substrate
79 first contact portion
80 second contact portion
81 connector
100 steering system
200 power system
300 communication system
V vehicle

The invention claimed is:

1. A vehicle, comprising:
 a first operation section that allows operation of the vehicle without software;
 a second operation section capable of operating the vehicle by using software;
 a communicator that communicates with an apparatus outside of the vehicle; and
 a switch that is provided physically and operable to stop operation of the second operation section without software,
 wherein the first operation section is a steering system that is steered only by a mechanical mechanism including a steering wheel, a steering shaft, a tie rod, a pinion gear, a rack, a knuckle arm, and a wheel when the switch stops operation of the second operation section without software during operation of the vehicle.

2. The vehicle according to claim 1, wherein
 the switch is a start switch of the vehicle,
 the switch functions as the start switch in a first operation mode of the switch and
 the switch functions as a stop switch in a second operation mode of the switch.

3. The vehicle according to claim 2, wherein
 the switch is a two stage switch,
 the switch functions as the start switch by operation in a first stage, and
 the switch functions as the stop switch by operation in a second stage.

4. The vehicle according to claim 2, wherein how to cause the switch to function as the stop switch is displayed on a display mounted on the vehicle.

5. The vehicle according to claim 1, wherein a part of the second operation section that performs an operation which affects a driving operation of the vehicle is excluded from a part whose operation is to be stopped.

6. The vehicle according to claim 5, wherein the part of the second operation section excluded from an object whose operation is to be stopped includes at least one of an internal combustion engine control apparatus, a headlight control apparatus, an airbag control apparatus, a wiper control apparatus, a hazard lamp control apparatus, a power window control apparatus, and a door lock control apparatus.

7. The vehicle according to claim 1, wherein the second operation section is capable of operating the vehicle independently of operation by a driver.

8. The vehicle according to claim 5, wherein the part of the second operation section excluded from an object whose operation is to be stopped includes a negative pressure electric pump when the vehicle is an electric vehicle (EV).

9. The vehicle according to claim 3, wherein
 the operation in the first stage and the operation in the second stage are each a pressing operation, and
 a pressing pressure for the operation in the second stage is larger than a pressing pressure for the operation in the first stage.

10. The vehicle according to claim 9, wherein a press-in amount for the operation in the second stage is larger than a press-in amount for the operation in the first stage.

11. The vehicle according to claim 1, wherein the communicator performs radio communication via the Internet connection with the apparatus outside of the vehicle.

12. The vehicle according to claim 1, wherein the vehicle is any one of a gasoline vehicle, a diesel vehicle, a hybrid vehicle (HV), a plug in hybrid vehicle (PHV), a plug in hybrid electric vehicle (PHEV), and an electric vehicle (EV).

13. The vehicle according to claim 3, further comprising a predetermined operation section that is stopped when the operation in the second stage is performed, the predetermined operation section includes at least one of an assist motor, a torque sensor, an internal combustion engine control apparatus, a headlight control apparatus, an airbag control apparatus, a communication control apparatus, a power steering control apparatus, a transmission control apparatus, and a throttle valve actuator.

14. A stop switch apparatus to be mounted on a vehicle, the vehicle including a first operation section that allows operation of a vehicle without software, a second operation section capable of operating the vehicle by using software, and a communicator that communicates with an apparatus outside of the vehicle, the stop switch apparatus comprising:
 a stop switch provided physically; and
 a hardware logic circuit that stops operation of the second operation section without software when the stop switch is operated, and
 wherein the first operation section includes a steering system which is steered only by a mechanical mechanism including a steering wheel, a steering shaft, a tie rod, a pinion gear, a rack, a knuckle arm, and a wheel when the second operation section does not function by the stop switch during operation of the vehicle.

* * * * *